July 10, 1951

O. WITTEL 2,559,911

INTERLOCKING MOTION-PICTURE CAMERA DIAPHRAGM AND SHUTTER RELEASE STRUCTURE

Filed March 7, 1950

OTTO WITTEL
INVENTOR

BY Daniel J. Mayne
Donald H. Stewart
ATTORNEYS

OTTO WITTEL
INVENTOR

July 10, 1951  O. WITTEL  2,559,911
INTERLOCKING MOTION-PICTURE CAMERA DIAPHRAGM
AND SHUTTER RELEASE STRUCTURE
Filed March 7, 1950  3 Sheets-Sheet 3

OTTO WITTEL
INVENTOR

BY
ATTORNEY & AGENT

Patented July 10, 1951

2,559,911

UNITED STATES PATENT OFFICE 2,559,911

INTERLOCKING MOTION-PICTURE CAMERA DIAPHRAGM AND SHUTTER RELEASE STRUCTURE

Otto Wittel, Rochester, N. Y., assignor to Eastman Kodak Company, Rochester, N. Y., a corporation of New Jersey Application March 7, 1950, Serial No. 148,105

3 Claims. (Cl. 88—16)

This invention relates to photography and more particularly to an interlocking diaphragm and shutter release structure for motion-picture cameras. One object of my invention is to provide a mechanism which can be used to lock the camera trigger except when a diaphragm member has been moved to a predetermined position. Another object of my invention is to provide a simple form of power-driven motion-picture camera in which the spring-driven mechanism may be engaged and released by a trigger member, which trigger member may, in turn, be released or latched by a diaphragm. A still further object of my invention is to provide a trigger structure which is laterally flexible to reduce the shock of the spring-operated mechanism suddenly coming to rest. A still further object of my invention is to provide a simple means of locking the trigger against movement when the camera is not in use by moving the diaphragm to a predetermined position. Other objects will appear from the following specification, the novel features being particularly pointed out in the claims at the end thereof.

Coming now to the drawings wherein like reference characters denote like parts throughout:

One of the rather difficult and expensive items in objectives for motion-picture cameras is the iris-type diaphragm which is commonly used, since with extremely small objectives the diaphragm leaves are very delicate, small, and difficult to make, and are, accordingly, expensive. Disk-type diaphragms are, of course, well known, but in using such diaphragms it is sometimes difficult to properly position a diaphragm opening on the axis of an objective and, of course, if the diaphragm opening is offset from the axis, poor results may well be obtained. In addition, it is desirable to provide a means for normally keeping an objective covered to prevent the entrance of dust and dirt, and this can readily be accomplished with a disk diaphragm, but if a diaphragm is to be used in this manner it is desirable to provide a positive means for preventing the operation of the camera, except when a diaphragm opening is properly positioned accurately on the axis of a camera objective. My present invention is particularly directed to overcoming these well-known difficulties, and I provide an interlock between the disk diaphragm and the shutter trigger for preventing the operation of the shutter trigger except when a diaphragm opening is accurately positioned on the axis of the lens, so that this diaphragm can be used as a lens-cap since, when in this position, the trigger will also remain latched.

Figure 1:
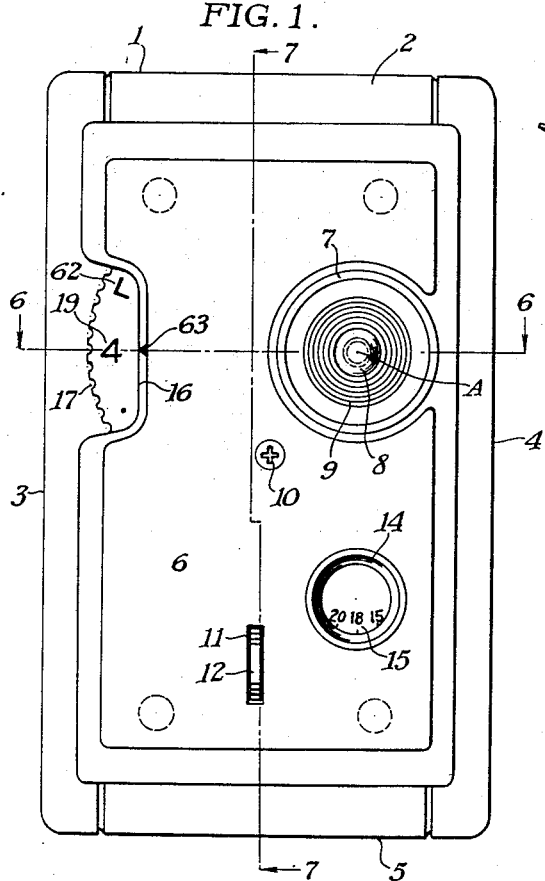
Fig. 1 is a front elevation of an inexpensive spring-driven motion-picture camera having an interlocking diaphragm and shutter release constructed in accordance with and embodying a preferred form of my invention.

Coming now to the drawings, Fig. 1 shows a front plan view of a typical camera embodying my improved interlocking mechanism. The camera may consist of a body 1 having a front wall 2, side walls 3 and 4, and a bottom wall 5. The front wall supports a cover plate 6 through which a lens mount 7 projects; the objective 8 being mounted inside of a tubular hoodlike member 9. The cover plate 6 may be attached as by a screw 10 and it is provided with a slot 11 through which the handle 12 of a trigger member designated broadly as 13 may project.

The front plate also has a window 14 through which a footage scale 15 may be viewed, and the front plate is notched at 16 so that a portion of the periphery 17 of a disk diaphragm 18 may project far enough to expose a diaphragm scale partially shown at 19 to indicate the size of a diaphragm opening aligned with the axis "A" of the objective.

Figure 3:
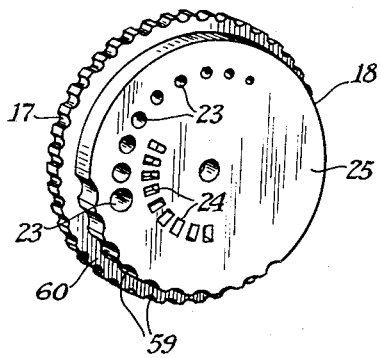
Fig. 3 is a perspective view of a disk-type diaphragm, which forms a part of my invention, removed from the camera.
Figure 6:
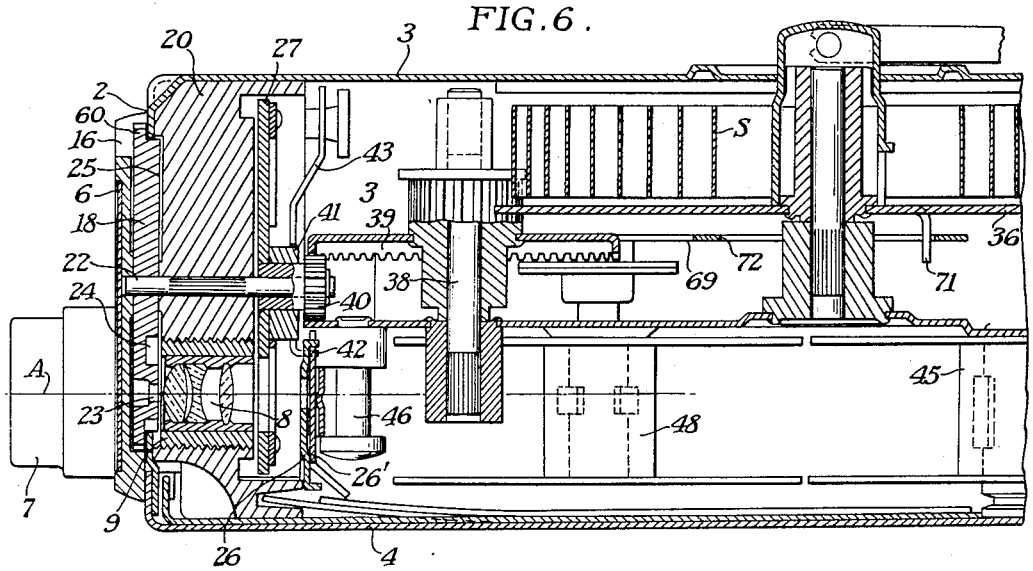
Fig. 6 is a transverse section taken on line 6—6 of Fig. 1 through the camera.
Figure 7:
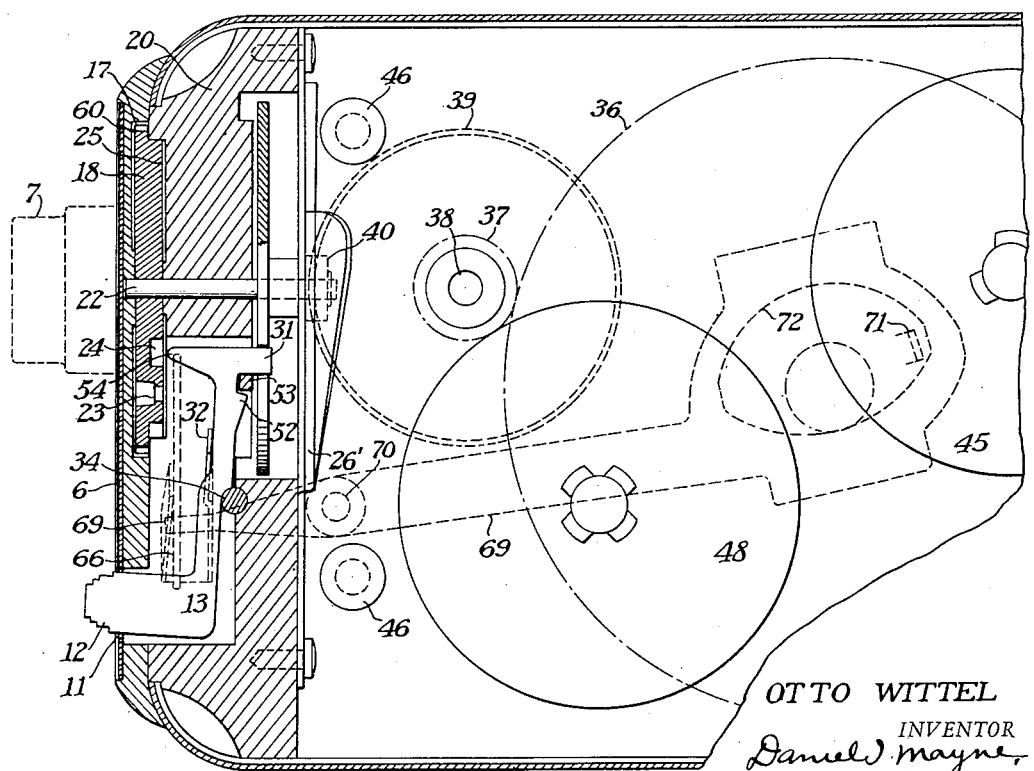
Fig. 7 is a vertical section taken on line 7—7 of Fig. 1 through the camera.

Referring to Figs. 6 and 7, I prefer to provide a front supporting member 20, preferably in the form of a casting; this support carrying the objective 8. The disk diaphragm 18 is pivoted on a stud shaft 22 and may be turned thereon to position any one of a series of apertures 23 on the axis "A" of the objective. Referring to Fig. 3, the apertures 23 are each of known value, and for each of the apertures there is a slot 24 having a definite relationship to each aperture and extending into the rear face 25 of the disk diaphragm.

The objective 8 forms an image of an object being photographed in the film gate consisting of the front plate 26 and the rear plate 26' through which a film may pass. Between the objective 8 and the film gate 26 there is a shutter 27, best shown in Figs. 8 and 9. This shutter normally turns in a counter-clockwise direction and, in the present form, consists of a disk having an arcuate slit 28 through which light passes in making an exposure. A hub member 29 fastened to the shutter disk is provided with a stop shoulder 30 against which the upper end 31 of a trigger may project when the trigger is moved to its operative position by means of a spring arm 32 of the spring 33; this spring arm rocking the trigger about a shaft 34 when the handle 12 is released.

Figure 5:
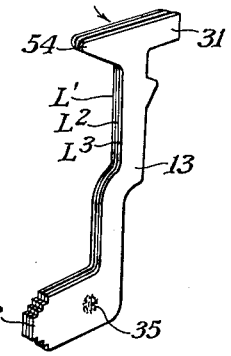
Fig. 5 is a perspective view of the trigger member when moved from the camera.
Figure 9:
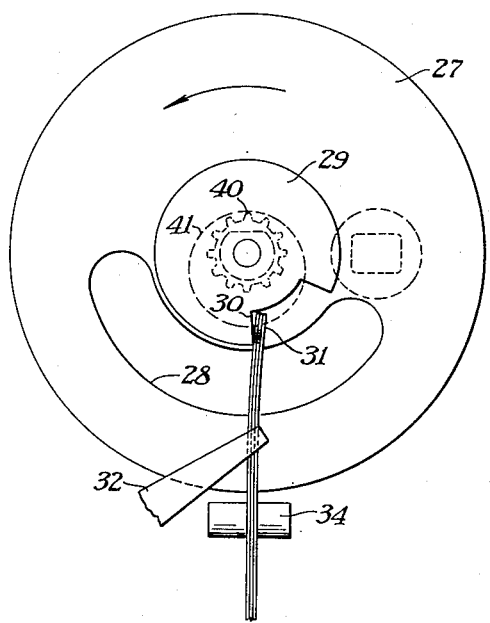
Fig. 9 is a view similar to Fig. 8 but with the spring-driven mechanism shown at the point of impact with the trigger as the mechanism is brought to rest.

Referring to Fig. 5, it should be noticed that the trigger consists of a plurality of laminations L—1, L—2, L—3, etc., of thin metal. The trigger laminations are preferably spot-welded together as at 35 adjacent the handle of the trigger, so that at the opposite end 31 the laminations may independently flex, as indicated in Fig. 9. Thus, when the rapidly rotating shutter 27 is making pictures under the impulse of its spring drive, the spring-driven mechanism, through the lug 30, will strike the flexible upper end 31 of the trigger, causing the laminations to flex, as indicated in Fig. 9, a short distance, as perhaps a sixteenth of an inch, to soften the shock of the spring-driven mechanism being brought to rest.

From Figs. 6 and 7, the spring-driven mechanism includes a drive spring "S," this spring normally turning a gear 36 meshing with pinion 37 and turning a shaft 38 which also turns the crown gear 39. This crown gear turns pinion 40 and with it the hub 41 of the shutter member 27 so that the shutter member is at the extreme end of the power-driven mechanism train. A pull-down mechanism may also be included in this train, including a pull-down claw 42 having an arm 43 which may be operated up-and-down and in-and-out in a well-known manner. Since the pull-down forms no part of the present invention, it need not be further described here, but it can well be made in accordance with the film-feeding mechanism shown in Wittel and Jungjohann, Serial No. 85,006, filed April 1, 1949, now Patent No. 2,521,957, issued September 12, 1950.

The film may be wound on a reel 45 and may be passed over a guide 46 through the gate 26—27 and to a take-up reel 48 in the usual manner.

Figure 4:
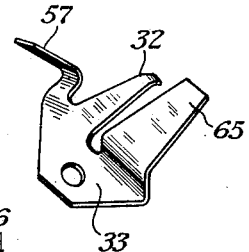
Fig. 4 is a perspective view of a spring used in assembling the interlocking diaphragm and trigger structure.
Figure 2:
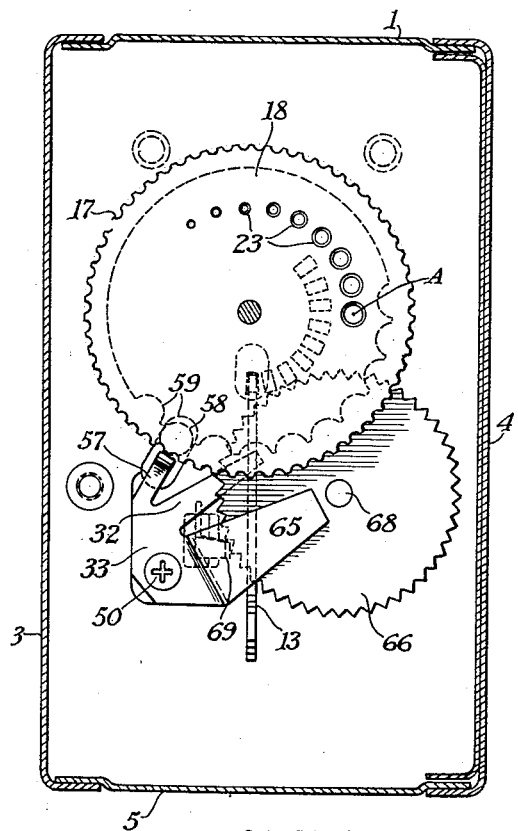
Fig. 2 is a front plan view similar to Fig. 1, but with the cover plate removed from the camera front.

From Figs. 2 and 4 it will be noticed that there is a spring 33 attached to the mechanism plate 20 by a screw 56. This spring has three arms; the function of arm 32, as above described, being to press the trigger into its operative position for holding the spring-drive mechanism against operation. As indicated in Fig. 7, arm 33 presses inwardly upon the trigger above the pivotal point 34 so that the trigger is normally pressed inwardly. However, by pressing in on the trigger handle 12, under some circumstances the trigger may be rocked about the shaft 34, removing the end 31 from beneath the latching lug 30, best shown in Figs. 8 and 9, and removing a latch member 52 on the trigger from a cooperating latch element 53 on the front plate 20. The mechanism may then run and pictures will be taken as long as the handle 12 is held inwardly. If it is desired to lock the trigger in a running position, the handle 12 is pushed in and then raised upwardly, causing the latch 52 to engage the outer surface of latch element 53 and holding the operative end 31 of the trigger in its inoperative position. The trigger then will have to be moved downwardly before the power-driven mechanism will stop running.

Since I latch the trigger against movement except when a diaphragm aperture is aligned properly with the axis "A" of the objective, I provide a finger 54 on the trigger which is of sufficient width to enter a slot 24 in the diaphragm disk 18. From Fig. 7 it will be noticed that the diaphragm disk 18 and the shutter 27 lie in parallel planes spaced apart. The distance between the diaphragm disk and the shutter 27 is less than the necessary movement of the trigger to release the power drive mechanism and, accordingly, the smooth rear surface 25 of the diaphragm disk 18 normally holds the trigger against operation as long as the finger 54 rests on this diaphragm surface. However, when the diaphragm is turned so that a notch 24 lies opposite the finger 54, a diaphragm aperture 23 is accurately located on the axis "A" of the objective and, accordingly, the trigger can be moved to release the power drive as soon as the finger enters the slot 24. Moreover, the length of these slots is sufficient to permit the sliding movement of the trigger necessary to engage the latch elements 52 and 53 which hold the trigger in its inoperative or mechanism-running position. It is only necessary to locate the slots 24 accurately with respect to the diaphragm apertures 23 to insure the proper positioning of a diaphragm aperture relative to the lens.

In order to assist in properly positioning the diaphragm, the spring 33 is provided with an arm 57 which may engage a roller 58, as shown in Fig. 2. This roller may be pressed by the spring into any one of a series of arcuate cutouts 59 in the diaphragm flange 60, and these tend to position a diaphragm opening 23 on the axis "A" of the objective.

When the camera is not in use it is desirable to cover the objective with a blank or unperforated portion of the diaphragm disk 17, so that the diaphragm is provided with an indication 62 marked "L," indicating lock. Thus, when "L" is brought opposite the pointer 63, a smooth rear surface of the diaphragm lies opposite the trigger finger 54, and pressure on the handle 12 of the trigger cannot move the trigger to release it. When pictures are to be made, the diaphragm may then be adjusted to the proper opening, such as "f/4," indicated at 19 in Fig. 1, before operation of the trigger may take place.

The third arm 65 of the spring 53 is used to hold a counter disk 66 in its operative position; this counter disk carrying a suitable scale, as indicated at 15, Fig. 1, to indicate the footage of film used. The disk 66 may turn on a shaft 68 and be moved one step at a time by means of an arm 69 oscillated about a shaft 70 each time a lug 71, carried by the gear 36 as shown in Fig. 6, makes a complete revolution, since this lug acts on the inside cam 72. However, this counter mechanism forms no part of my present invention.

In construction, the interlocking mechanism is extremely inexpensive and yet it insures the proper positioning of the diaphragm before the trigger can be operated for either manually controlled bursts of exposures, or when the trigger is latched in its inoperative position to produce long bursts of exposures. This construction provides a very simple means for protecting the objective and latching the trigger when the camera is not in use by merely turning the diaphragm disk to its locked position. The construction adds but little cost to the camera because a diaphragm and a shutter must be used, and, by arranging these in the manner described above, several functions can be obtained with very few parts simply arranged.

Figure 8:
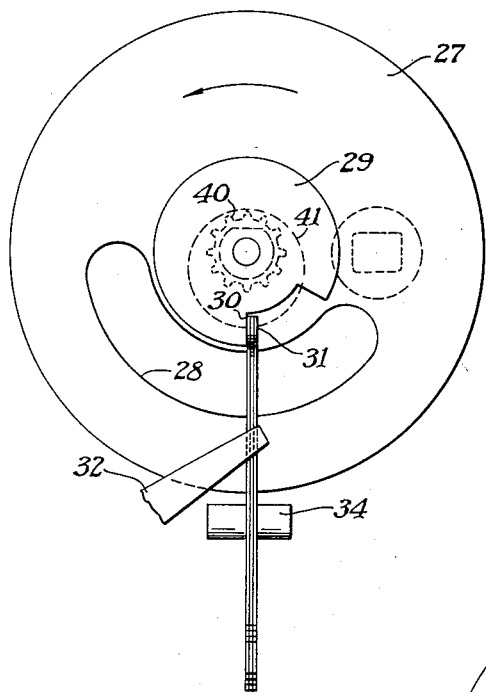
Fig. 8 is a fragmentary detail front plan view of the shutter trigger in its normal position of rest holding the spring-driven mechanism against movement.

In operation, the interlocking structure is extremely handy. If an operator should depress the trigger handle 12 and find that nothing happens, he will realize that the camera is either in its locked position with the lens protected against dirt, or dust; or, that the diaphragm has not been turned properly to position an aperture on the objective axis. He will then turn the knurled edge 17 of the diaphragm disk and the spring-pressed roller 58 will assist in locating the disk diaphragm in the proper position. As this is done, a notch 24 is also moved opposite the finger 54 of the trigger. The trigger may now be depressed by the handle 12, permitting the power-operated mechanism to function to move film through the gate 26—27 and to operate the shutter to take a series of pictures. Should it be desired to latch the trigger in its inoperative position, it may be turned about the pivot 12 and slid upwardly until the latch members 52 and 53 engage to hold the stop member 31 out of the path of the power-operated mechanism. The notches 24 are of sufficient length, of course, to permit this movement. To release the trigger from its latched position, the handle 12 may be moved downwardly, disengaging latch members 52 and 53 and permitting the spring arm 33 to cause the stop member 31 to move into the path of the power-operated mechanism which, of course, causes the shutter hub member 30 to strike part 31 of the trigger a lateral blow, as indicated in Fig. 8. Since the laminations may separately flex, the upper end of the trigger may move to the Fig. 9 position and, on occasion, move the shutter mechanism rearwardly a short distance as the mechanism comes to rest. Since the mechanism block 20 is provided with a slot 80 in which the lower portion of the trigger 13 may move longitudinally, or up-and-down, but not sideways, only the upper portion of the trigger laminations will flex, as indicated in Fig. 9, and the mechanism will be brought gently to rest.

While I have described a preferred form of mechanism which embodies a satisfactory means for carrying out my invention, it is obvious that variations of this idea will occur to those skilled in the art. I therefore consider as within the scope of my invention all such forms and modifications as may come within the scope of the appended claims.

Having thus described my invention, what I claim is new and desire to secure by Letters Patent of the United States is:

1. In an interlocking motion-picture diaphragm and shutter release structure for motion-picture cameras of the type employing a camera body, a spring drive, film-moving mechanism operable by the spring drive, a shutter operable by the spring drive, an objective, and a film gate carried by the camera, the combination with a disk diaphragm pivotally mounted on the camera, a plurality of diaphragm openings in said disk and movable into coaxial positions with respect to the objective, a shutter trigger, a finger on the trigger, a mount for the trigger on which the trigger may both turn and slide, a latch tending to hold the trigger in an inoperative position to which it may be moved by sliding, a shutter-engaging element on the trigger for holding the power-operated mechanism against movement when said trigger is in a rest position, a plurality of slots in the diaphragm arranged in a predetermined position with respect to the diaphragm apertures, each slot being of sufficient length to receive the finger on the trigger when the trigger is turned on its pivot to release the spring drive, and to receive the finger when the trigger is slid to latch the trigger in a spring-drive release position, said disk diaphragm latching the trigger against movement in a releasing direction except when a slot lies opposite the finger and a diaphragm opening lies axially of the objective.

2. In an interlocking motion-picture diaphragm and shutter release structure for motion-picture cameras of the type employing a camera body, a spring drive, film-moving mechanism operable by the spring drive, a shutter operable by the spring drive, an objective, and a film gate carried by the camera, the combination with a disk diaphragm pivotally mounted on the camera, a plurality of diaphragm openings in said disk and movable into coaxial positions with respect to the objective, a shutter trigger, said trigger comprising a plurality of laminations of thin metal, a handle on the trigger, said laminations being fastened together adjacent the trigger whereby the opposite end of the trigger is flexible and lies in the path of a portion of the spring-driven mechanism to flex when said trigger end is brought into engagement with the said spring-driven mechanism, a plurality of slots in the diaphragm having a predetermined relationship with the diaphragm apertures, said trigger having a finger movable into an aperture only when the diaphragm is positioned with an aperture coaxially positioned with respect to said objective, the diaphragm disk blocking releasing movement of the shutter trigger when the diaphragm disk is positioned without a diaphragm aperture being in axial alignment with the objective.

3. In an interlocking motion-picture diaphragm and shutter release structure for motion-picture cameras of the type employing a camera body, a spring drive, film-moving mechanism operable by the spring drive, a shutter operable by the spring drive, an objective, and a film gate carried by the camera, the combination with a disk diaphragm pivotally mounted on the camera, a plurality of diaphragm openings in said disk and movable into coaxial positions with respect to the objective, a shutter trigger, said trigger comprising a plurality of laminations of thin metal, a handle on the trigger, said laminations being fastened together by spot-welding transversely of the laminations adjacent the trigger whereby the opposite end of the trigger is flexible and the individual laminations may flex transversely of the trigger and the trigger lies in the path of a portion of the spring-driven mechanism to flex when said trigger end is brought into engagement with the said spring-driven mechanism, a plurality of slots in the diaphragm having a predetermined relationship with the diaphragm apertures, said trigger having a finger movable into an aperture only when the diaphragm is positioned with an aperture coaxially positioned with respect to said objective, the diaphragm disk blocking releasing movement of the shutter trigger when the diaphragm disk is positioned without a diaphragm aperture being in axial alignment with the objective and the slot in the diaphragm having a length to permit the trigger to slide longitudinally to engage a latch element on the trigger with a latch element on the camera to hold the trigger in a spring drive releasing position.

OTTO WITTEL.

REFERENCES CITED

The following references are of record in the file of this patent:

UNITED STATES PATENTS

| Number | Name | Date |
| --- | --- | --- |
| 582,219 | Mosher | May 11, 1897 |
| 2,462,302 | Bolsey | Feb. 22, 1949 |
| 2,504,312 | Fairbank | Apr. 18, 1950 |